US012649141B2

(12) United States Patent
Gabler et al.

(10) Patent No.: US 12,649,141 B2
(45) Date of Patent: Jun. 9, 2026

(54) CONTINUOUS FLOW REACTOR FOR REACTING AN EDUCT

(71) Applicant: Fraunhofer-Gesellschaft Zur Förderung Der Angewandten Forschung E.V., Munich (DE)

(72) Inventors: Andreas Gabler, Berlin (DE); Wolfgang Schade, Goslar (DE); Thomas Gimpel, Goslar (DE); Patrick Preuster, Heideck (DE); Peter Wasserscheid, Erlangen (DE)

(73) Assignee: FRAUNHOFER-GESELLSCHAFT ZUR FÖRDERUNG DER ANGEWANDTEN FORSCHUNG E.V., Munich (DE)

(*) Notice: Subject to any disclaimer, the term of this patent is extended or adjusted under 35 U.S.C. 154(b) by 0 days.

(21) Appl. No.: 17/266,784

(22) PCT Filed: Aug. 7, 2018

(86) PCT No.: PCT/EP2018/071381
§ 371 (c)(1),
(2) Date: Feb. 8, 2021

(87) PCT Pub. No.: WO2020/030251
PCT Pub. Date: Feb. 13, 2020

(65) Prior Publication Data
US 2021/0316269 A1 Oct. 14, 2021

(51) Int. Cl.
B01J 19/24 (2006.01)
B01J 19/00 (2006.01)
C01B 3/0015 (2026.01)

(52) U.S. Cl.
CPC ......... B01J 19/249 (2013.01); B01J 19/0093 (2013.01); C01B 3/0015 (2013.01);
(Continued)

(58) Field of Classification Search
CPC .................. B01J 19/249; B01J 19/0093; B01J 2219/00783; B01J 2219/00822;
(Continued)

(56) References Cited

U.S. PATENT DOCUMENTS 6,680,044 B1 * 1/2004 Tonkovich .............. C01B 3/384
423/652
8,629,189 B1 1/2014 Wilson et al.
(Continued)

FOREIGN PATENT DOCUMENTS

CN 108043355 A 5/2018
DE 202007013730 U1 7/2008
(Continued)

OTHER PUBLICATIONS

Kreuder et al (Heat storage by the dehydrogenation of methylcyclohexane e Experimental studies for the design of a microstructured membrane reactor, Elsevier, 2016) (Year: 2016).*
(Continued)

*Primary Examiner* — Anthony J Zimmer
*Assistant Examiner* — Logan Laclair
(74) *Attorney, Agent, or Firm* — Alix, Yale & Ristas, LLP

(57) ABSTRACT

The invention relates to a continuous flow reactor having a wall which delimits a channel, wherein at least one sub-area is arranged in the channel that has microstructuring which includes individual structures, the diameter of which on a base is between about 10 µm to about 100 µm. The invention further relates to methods for reacting a gaseous or liquid educt under the action of a catalyst.

16 Claims, 4 Drawing Sheets

(52) U.S. Cl.
  CPC .............. *B01J 2219/00783* (2013.01); *B01J 2219/00822* (2013.01); *B01J 2219/00835* (2013.01); *B01J 2219/0086* (2013.01); *B01J 2219/2479* (2013.01); *B01J 2219/2485* (2013.01); *B01J 2219/2497* (2013.01)

(58) Field of Classification Search
  CPC ...... B01J 2219/00835; B01J 2219/0086; B01J 2219/2479; B01J 2219/2485; B01J 2219/2497; B01J 2219/00765; B01J 19/2415; C01B 3/0015; Y02E 60/32
  See application file for complete search history.

(56) References Cited

U.S. PATENT DOCUMENTS

| | | | |
|---|---|---|---|
| 2003/0150707 A1 | 8/2003 | Carmignani et al. | |
| 2004/0082804 A1* | 4/2004 | Brophy ................. | C07B 61/00 560/1 |
| 2005/0191533 A1 | 9/2005 | Kim et al. | |
| 2009/0010823 A1 | 1/2009 | Mazanec et al. | |

FOREIGN PATENT DOCUMENTS

| | | | |
|---|---|---|---|
| DE | 102011100461 A1 | 11/2011 | |
| EP | 2643858 B1 | 7/2015 | |
| EP | 3015166 A1 * | 5/2016 | ......... B01J 19/0013 |

| | | | |
|---|---|---|---|
| WO | 2015011072 A1 | 1/2015 |
| WO | 2015169845 A1 | 11/2015 |
| WO | 2016008487 A1 | 1/2016 |
| WO | 2017217433 A1 | 12/2017 |

OTHER PUBLICATIONS

Li et al. (Engineering Pt/carbon-nanofibers/carbon-paper composite towards highly efficient catalyst for hydrogen evolution from liquid organic hydride, International Journal of Hydrogen Energy, 2015) (Year: 2015).*

Kreuder et al. (Catalyst development for the dehydrogenation of MCH in a microstructured membrane reactor—For heat storage by a Liquid Organic Reaction Cycle, Catalysis Today, 2015) (Year: 2015).*

Doctoral Thesis, "Integration of a LOHC-storage technology in an industrial context" by Martin Thomas Eypasch, Nov. 10, 2015, 279 pgs. English Translation of relevant pp. 67 and 68 provided.

"A new reactor concept for the dehydrogenation of LOHC", Rachid Benker, et al., Lehrstuhl für Chemische Reaktionstechnik Friedrich-Alexander-Universität Erlangen-Nürnberg, WHEC Zaragoza, Jun. 14, 2016, 14 pgs.

PCT International Research Report and Written Decision from the International Research Authority for International application No. PCT/EP2018/071381 filed Aug. 7, 2018, Date of mailing: Mar. 7, 2019, 7 pgs.

* cited by examiner

CONTINUOUS FLOW REACTOR FOR REACTING AN EDUCT

BACKGROUND

The invention relates to a flow reactor having a wall that delimits a channel. The invention also relates to a method for reacting a gaseous or liquid reactant under the influence of a catalyst, in which the reactant or educt is supplied to a channel of a flow reactor, the channel being delimited by a wall. Flow reactors and methods of this type can be used for the synthesis of chemical products from liquid or gaseous precursor substances. In particular, such a flow reactor can be used for the hydrogenation or dehydrogenation of substances.

A tubular reactor is known from Martin Eypasch, "Wasserstoffspeicherung in LOHC-Systemen als Basis für industrielle Energiespeicheranwendungen" [hydrogen storage in LOHC systems as a basis for industrial energy storage applications], dissertation, ISBN: 978-3-8440-4946-6. Inside the reactor is a bulk or bed of a granular catalyst. A liquid reactant flows through the reactor during the operation thereof. This leads to the release of hydrogen under the influence of the catalyst. Therefore, a three-phase boundary (solid, liquid, gaseous) is formed on the surface of the catalyst. Heat can be added or removed through the wall of the reactor on a case-by-case basis.

This known reactor has the disadvantage that the heat within the bed of the catalyst material is almost exclusively transferred by convective transport processes due to the mostly point-like contacts between the individual grains. As a result, the output of the known reactor can be reduced, i.e. the rate of reaction is reduced or insufficient.

SUMMARY OF THE INVENTION

Therefore, the object of the invention is to provide a flow reactor and a method for reacting a reactant which exhibits improved efficiency and allows higher reaction rates.

According to the invention, the object is achieved by a flow reactor according to claim 1 and a method according to claim 9. Advantageous further developments of the invention are found in the subclaims.

The invention proposes a flow reactor having a wall. The wall can contain or consist of a metal or an alloy. In some embodiments of the invention, the wall can contain or consist of aluminum and/or titanium and/or a refractory metal and/or a stainless steel.

The wall delimits at least one channel which is provided to receive the reactants to be reacted. For this purpose, the channel is closed on at least three sides. In some embodiments of the invention, the channel is closed on four sides and thus has the shape of a closed tube. In yet other embodiments of the invention, the channel can be closed on five or six sides, resulting in the optical appearance of a tub or a closed container. In the latter case, the reactor works discontinuously, i.e. a predeterminable amount of reactants is filled in, reacted and finally removed. These three method steps are repeated cyclically. If the channel is open on two opposite sides, the flow reactor can also operate continuously, i.e. reactants flow through the flow reactor and are discharged as product after chemical reaction.

According to the invention, it is now proposed that at least one sub-area is arranged in the channel, which is provided with microstructuring containing individual structures, the diameter of which on a base is about 10 μm to about 30 μm. In some embodiments, the sub-area arranged in the channel can be a sub-area of the wall of the channel. In other embodiments of the invention, additional baffle plates or flow guide plates or carrier plates can be located in the channel, which are provided with the microstructuring according to the invention. On the one hand, the microstructuring leads to an increase in the surface area. On the other hand, the surface-enlarged planar elements can either have a catalytic effect themselves or be provided with catalytically active substances. Due to the arrangement thereof directly on the wall and/or flat installations in the channel, which can be connected to the wall, the heat supply or heat dissipation to the catalytically active surface can be improved compared to a bed of granular shaped bodies. As a result, the rate of the chemical reaction on the catalytically active surfaces can be increased.

In some embodiments of the invention, the microstructuring can be produced by laser radiation, which during a manufacturing step acts at least on a sub-area of the inner side and/or the outer side of the wall. In particular, laser radiation with a pulse duration of less than one nanosecond or less than 100 femtoseconds can be used for this purpose. In other embodiments of the invention, the pulse width can be from about 500 fs to about 5000 fs. In yet other embodiments of the invention, the pulse width can be from about 300 fs to about 1000 fs. The production of the structuring or the microstructuring by irradiation with a short pulse laser can be easily carried out in the large series production as well. Due to the contactless material processing, it is possible to avoid wet or dry chemical etching steps that are complex and contaminated with harmful substances.

In some embodiments of the invention, the microstructuring can be obtained by light from a short pulse laser which has a wavelength between about 700 nm and about 1050 nm. In some embodiments of the invention, the radiation of the short pulse laser can have a pulse energy of about 100 μJ to about 1 mJ. In some embodiments of the invention, the radiation of the short pulse laser can have a repetition rate of about 0.8 kHz to about 2 kHz. In some embodiments of the invention, the radiation of the short pulse laser can have a repetition rate of about 0.8 kHz to about 10 kHz. In some embodiments of the invention, the radiation of the short pulse laser can have a repetition rate of about 10 kHz to about 100 kHz. In some embodiments of the invention, the radiation of the short pulse laser can have a repetition rate of about 100 kHz to about 1 MHz. In other embodiments, the radiation of the short pulse laser can have a repetition rate of about 1 MHz to about 10 MHz. In yet other embodiments, the radiation of the short pulse laser can have a repetition rate of about 10 MHz to about 40 MHz. This allows fast and efficient structuring also of large-area microstructurings, even if a plurality of laser pulses must act on a single surface to produce the microstructuring.

In some embodiments of the invention, the light of the short pulse laser can be supplied to a pulse shaper, which adapts the pulse shape to a predetermined target shape. A self-learning system with a genetic algorithm can be implemented in the pulse shaper or in the control of the pulse shaper, so that the target shape of the pulses can be adapted during the operation of the short pulse laser depending on the microstructuring produced. In this way, it is possible to generate cone- or column-shaped microstructuring of high quality.

In some embodiments of the invention, the wall can be exposed to a process gas during the laser irradiation, for example to nitrogen or oxygen or air. If the process gas is supplied as a gas stream, it can simultaneously be used to remove material ablated by the laser radiation from the surface so that it does not contaminate adjacent surface areas.

In some embodiments of the invention, the microstructuring can effect an increase in the surface area of the first side by a factor of 20 to 60. In some embodiments of the invention, the microstructuring can cause an increase in the surface area of the first side by a factor of 25 to 55. This increases the size of the three-phase boundary, while at the same time keeping the dimensions of the flow reactor according to the invention compact.

In some embodiments of the invention, the microstructuring can exhibit individual structures having an aspect ratio of about 1:3 to about 3:1. This allows a sufficient enlargement of the surface area and good hydrophilic properties.

In some embodiments of the invention, the microstructuring can contain or consist of individual structures, the diameter of which on a base is about 10 $\mu$m to about 30 $\mu$m. In other embodiments of the invention, the microstructuring can contain or consist of individual structures, the diameter of which on a base is about 50 $\mu$m to about 100 $\mu$m or about 30 $\mu$m to about 80 $\mu$m. The length of these individual structures can also be about 10 $\mu$m to about 30 $\mu$m. In other embodiments, the height can be about 5 $\mu$m to about 50 $\mu$m. The length is in this case determined between the base and the tip of the individual structures. The base in the sense of the present description is considered to be the area or, in cross-section, the distance at which the microstructuring merges into the unstructured volume of the wall.

The elevations can be generated along a spatial direction, so that the impression of a corrugated or trapezoidal plate is created. In other embodiments of the invention, both spatial directions of the surface can be structured so that the microstructuring consists of a plurality of adjacent towers or columnar elevations. In some embodiments of the invention, different sub-areas can be structured differently, so that different sub-areas appear differently in an electron or light microscopic image.

In some embodiments of the invention, a catalyst can be applied to the microstructuring, at least on a sub-area thereof. As a result, catalyst material can be saved by using another, usually cheaper or more easily available, material for the heat conduction and mechanical stability of the wall.

In some embodiments of the invention, the catalyst can contain or consist of platinum and/or nickel and/or silver and/or palladium and/or manganese oxide and/or rhodium and/or ruthenium. In some embodiments of the invention, a binary, ternary or quaternary combination of said catalysts can be used.

In some embodiments of the invention, the surface coverage of the catalyst can be between about 0.05 mg·cm$^{-2}$ and about 0.4 mg·cm$^{-2}$. In some embodiments of the invention, the surface coverage of the catalyst can be between about 0.1 mg·cm$^{-2}$ and about 0.35 mg·cm$^{-2}$. Compared to flow reactor concepts known per se, expensive and rare catalyst material can thus be saved since this material is only applied to the surface of the microstructuring. Catalyst material is therefore only used where the three-phase boundary is formed.

In some embodiments of the invention, the catalyst can be applied to the microstructuring by a wet chemical impregnation process, thermal vapor deposition, sputtering, plasma spraying or other PVD or CVD processes which are known per se. This allows good control of the deposited layer thickness and economical consumption of the catalyst material.

In other embodiments of the invention, the catalyst can be applied to the wall before the microstructuring is produced, the microstructuring being generated after the deposition of the catalyst by laser structuring.

In some embodiments of the invention, the catalyst can be applied alternatively or also additionally in the production of the microstructuring by laser radiation from a gaseous or liquid precursor. In this case, the laser radiation can cause a surface modification and also an activation of the precursor.

In some embodiments of the invention, the microstructuring can be applied to both sides of the wall. While the inner microstructuring is catalytically active or is used as a carrier for a catalyst, the outer microstructuring can improve the heat transfer through the wall. This is due on the one hand to the increase in surface area. On the other hand, it has been found that microstructuring in the above mentioned order of magnitude can resonantly absorb and emit infrared radiation and in this way absorb almost 100% of the incident light and appear black. According to Kirchhoff's law, this allows the assumption that the surface behaves like an ideal black radiator. Accordingly, the surface absorbs heat radiation almost ideally. A structured sub-area of the wall can therefore have an emission of more than 85% or more than 90% or more than 95% for electromagnetic radiation with a wavelength of about 500 nm to about 2000 nm. In some embodiments of the invention, a structured sub-area of the wall for electromagnetic radiation with a wavelength of about 4 $\mu$m to about 25 $\mu$m can have a directed spectral emissivity of more than 80% or more 85% or more 90% or more 95%.

In some embodiments of the invention, the microstructuring can be hydrophilic. This renders possible a large-area three-phase boundary by improving the wetting of the microstructuring and thus of the catalyst with liquid reactants. At the same time, the microstructuring can be used as a bubble formation nucleus in gaseous products, so that gaseous products which are formed from the liquid reactant under the influence of the catalyst are efficiently expelled from the liquid. Hydrophilic microstructuring can be obtained by storing at least the structured sub-area after the laser structuring at more than 80° C. or more than 90° C. for about 1 h to about 2 h in water. Hydrophobic microstructuring can be obtained by tempering at least the structured sub-area after the laser structuring in the presence of oxygen and carbon dioxide (e.g. air) at more than 200° C. for about 1 h to about 2 h.

In some embodiments of the invention, heat can be supplied to or removed from the channel and the media flowing or disposed therein via the wall of the channel. In some embodiments of the invention, the side of the wall facing away from the channel can be brought into contact with a liquid or gaseous heat transfer medium for this purpose. In some embodiments of the invention, the heat transfer medium can undergo a phase transition so that condensation heat is released, which can be supplied to the medium flowing in the channel.

In other embodiments of the invention, the wall can be in contact with a heating device, for example a gas burner or an electrical heating resistor or an infrared radiation source. The heating power emitted by the heating device can be influenced by an optional control device so that the temperature within the duct remains constant within predeterminable limits.

In some embodiments of the invention, the reactant can be or contain a hydrogenated Liquid Organic Hydrogen Carrier system (LOHC). Such an LOHC can be used to store hydrogen in order to provide it as an energy carrier at a later time and/or at another location. If the LOHC, which is usually a liquid, is reacted with the flow reactor proposed according to the invention, the stored hydrogen can escape molecularly in at least one embodiment of the invention. The LOHC can subsequently be reused for another storage process.

In some embodiments of the invention, the LOHC can be selected from perhydro-dibenzenetoluene and/or methylcyclohexane/toluene and/or perhydro-N-ethylcarbazole/N-ethylcarbazole and/or perhydro-benzyltoluene/benzyltoluene. Such an LOHC can be hydrogenated and dehydrogenated at ambient pressure and comparatively low temperatures, so that the storage and withdrawal of hydrogen is possible in a simple way.

In some embodiments of the invention, the release of hydrogen can occur at a rate of more than $12\ g_{H2} \cdot g_{kat}^{-1} \cdot min^{-1}$ or more than $15\ g_{H2} \cdot g_{kat}^{-1} \cdot min^{-1}$ or more than $18\ g_{H2} \cdot g_{kat}^{-1} \cdot min^{-1}$ or more than $20\ g_{H2} \cdot g_{kat}^{-1} \cdot min^{-1}$ or more than $23\ g_{H2} \cdot g_{kat}^{-1} \cdot min^{-1}$. Such rates cannot be achieved with previously known catalysts. As a result, the installation space of the flow reactor according to the invention can be reduced or the efficiency increased.

BRIEF DESCRIPTION OF THE DRAWINGS

The invention shall be explained in more detail below by means of drawings without limiting the general concept of the invention. In this connection.

DETAILED DESCRIPTION

Figure 1:
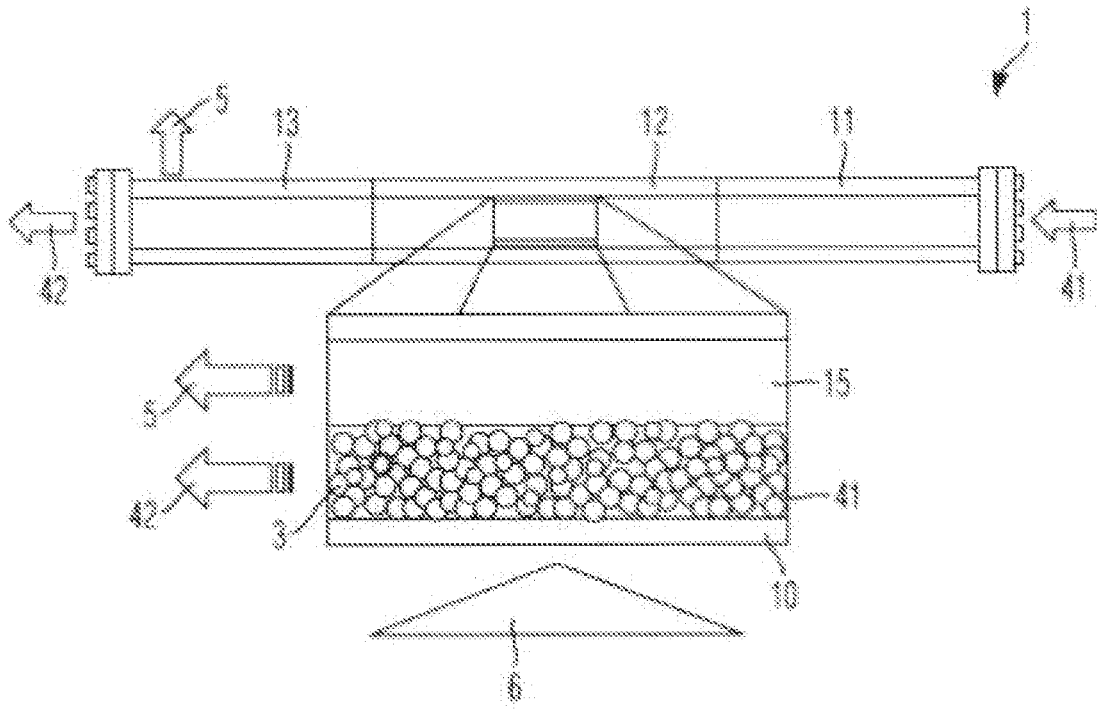
FIG. 1 shows a known flow reactor.

FIG. 1 shows a known flow reactor for the reaction of liquid or gaseous reactants. The flow reactor 1 has approximately the basic shape of a tube. The tube comprises a wall 10, which delimits a channel 15. The cross-section of the channel 15 can be polygonal or round. In some embodiments of the invention, the channel 15 can also have a freeform surface or an elliptic cross-section.

In the illustrated exemplary embodiment, the flow reactor 1 is divided into three longitudinal portions. A flow of at least one reactant 41 is supplied to the first longitudinal portion 11. The reactant 41 can be preheated in the first longitudinal portion 11 to render possible the subsequent reaction.

The second longitudinal portion 12 represents the actual reaction zone in which the supplied reactant(s) 41 is/are reacted. In the third longitudinal portion 13, the products produced in the preceding longitudinal portion 12 can be cooled. Then, liquid products can be discharged in a continuous product stream 42. Optionally, gaseous products 5 can be discharged from the flow reactor 1 via a further outlet.

The first and third longitudinal portions are here optional and can also be omitted in some embodiments of the invention.

As further illustrated in FIG. 1, the second longitudinal portion 12 contains a catalyst 3. The catalyst 3 is present in known flow reactors 1 as a porous shaped body or as a bed of particles. The reactant 41 flows through the cavities forming between the particles. In this process, the liquid reactant 41 is reacted to form the liquid product 42 and/or the gaseous product 5. In the illustrated exemplary embodiment, the filling level of the channel 15 with catalyst 3 and liquid reactant 41 is about 50%, so that gaseous products 5 can escape to above the free level where they can be transported in the channel.

Occasionally, a heat flow 6 can be supplied through the wall 10 to procure the activation energy of the chemical reaction taking place in the flow reactor 1. In other embodiments of the invention, the heat energy generated in exothermic reactions can be dissipated through the wall 10. For this purpose, the wall 10 of the flow reactor 1 can, at least in some portions, be in contact with a liquid or gaseous heat transfer medium or a heating device or a cooling device.

Figure 2:
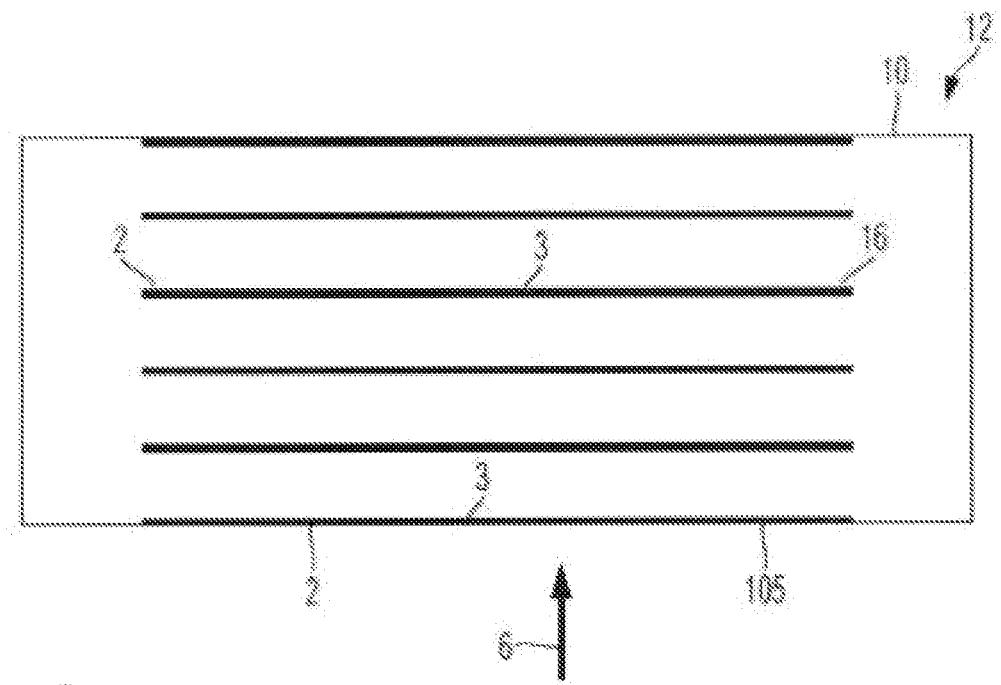
FIG. 2 shows a flow reactor according to the present invention according to a first embodiment.

FIG. 2 shows a first embodiment of a flow reactor according to the present invention. Equal components of the invention are provided with equal reference signs, so that the following description is limited to the essential differences.

FIG. 2 shows the second longitudinal portion 12 of the flow reactor 1. Instead of the particles from a catalyst material or the particles coated with catalyst material, the flow reactor according to the invention contains sub-areas 105 which are provided with microstructuring 2 that contains individual structures, the diameter of which on a base is about 10 µm to about 30 µm. The microstructuring 2 is explained in more detail below on the basis of FIG. 7.

As shown in FIG. 2, the sub-area 105 can be arranged on the wall 10 of the flow reactor 1 in some embodiments of the invention. Alternatively or additionally, flow guide plates and/or baffle plates 16 can be disposed in the channel 15 of the flow reactor 1, which plates are at least partially provided with the microstructuring 2 according to the invention. The flow guide plates 16 can be connected to the wall 10 to thus allow good heat conduction. Due to this, it is possible that a heat flow 6, which is supplied from the outside through the wall 10, directly heats the flow guide plates 16. In contrast to known flow reactors, in which the catalyst 3 is heated by the flowing reactant 41, a more uniform heat distribution can be achieved in this way and/or a greater heating power can be introduced into the reactant 41.

The microstructuring 2 itself can be catalytically active or can be coated with a catalyst 3. In some embodiments of the invention, the catalyst 3 can contain or consist of platinum and/or silver and/or palladium and/or manganese oxide and/or rhodium. In some embodiments of the invention, the material of the wall 10 can be selected from aluminum, titanium or silver or from an alloy which contains at least one of these elements, or from a stainless steel.

If gaseous products 5 are formed at the microstructuring 2 during the reaction of the liquid reactant 41, the microstructuring 2 can be used as a bubble formation nucleus and thus further increase the reaction rate.

In some embodiments of the invention, the microstructuring 2 can be produced by laser radiation, in particular by radiation from a short pulse laser. In some embodiments of the invention, such a short pulse laser can have pulse durations of about 100 femtoseconds to about 1 nanosecond. If larger subareas 105 are to be manufactured, the laser beam can be scanned over the subareas during the fabrication of said microstructuring 2. The optional catalyst 3 can be applied after the microstructuring has been produced, for example by CVD or PVD processes or wet chemical impregnation. In other embodiments of the invention, the sub-areas 105 to be structured can be coated with the catalyst and subsequently be structured with laser radiation. It is thus possible to increase the catalytic activity.

In some embodiments of the invention the microstructuring 2 can be hydrophilic. This leads to good wetting with liquid, in particular aqueous, reactants 41, which can further increase the reaction rate within the reactor 1.

Figure 3:
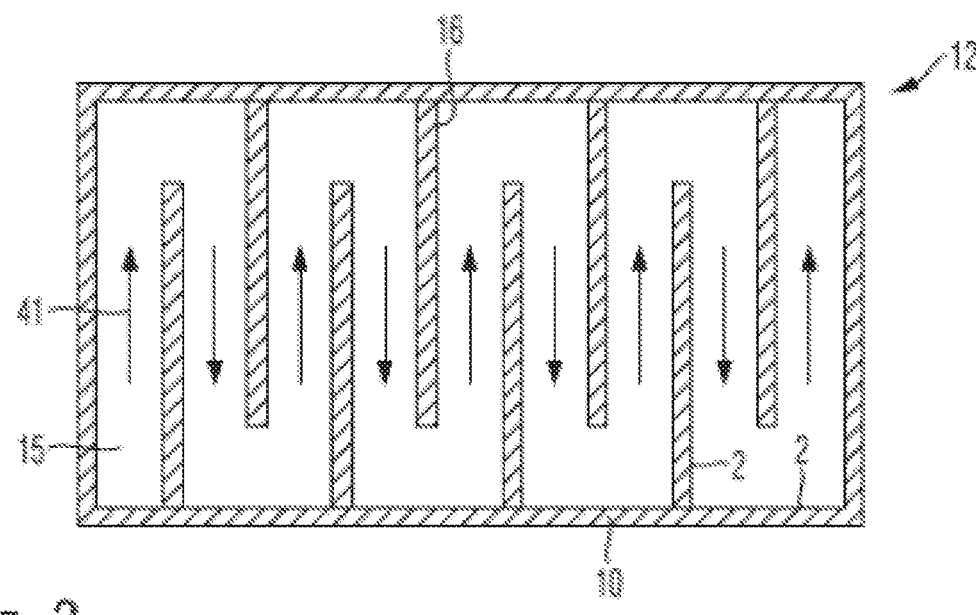
FIG. 3 shows a flow reactor according to the present invention according to a second embodiment.

FIG. 3 shows a section of a second embodiment of a flow reactor according to the invention. In this case, too, only the second longitudinal portion 12 of the flow reactor 1 shown in FIG. 1 is illustrated. The first and third longitudinal portions 11 and 13 are optional and can also be omitted in some embodiments of the invention.

As shown in FIG. 3, the flow guide plates 16 are arranged within the channel 15 in such a way that they are attached to the wall 10 of the channel 15 on one side and project freely on one side. As a result, the flow of the reactants 41 is directed in a meandering manner through the flow reactor 1. This allows longer contact times of the reactants 41 or longer residence times while the installation space remains the same. The microstructuring 2 according to the invention as well as the optional coating of the microstructuring with at least one catalyst 3 can be attached to both the flow guide plates 16 and the wall 10. The flow guide plates 16 can be provided with the microstructuring on one or both sides. The flow guide plates 16 can be provided with the microstructuring 2 over the entire surface or only partially. The same applies to the wall 2, which can also be provided with the microstructuring 2 over the entire surface or only partially or not at all. The thermal conductivity can be improved by an integral bond between the flow guide plates 16 and the wall 10, so that a heat supply through the wall 10 also heats the flow guide plates 16 evenly, as a result of which the catalytic effect of the microstructuring can be improved.

Figure 4:
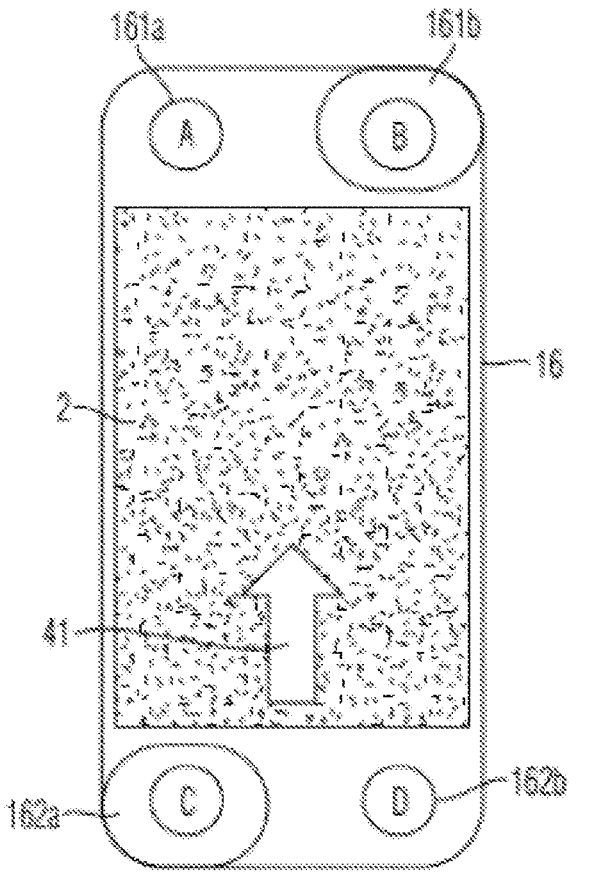
FIG. 4 shows a component of a flow reactor according to a third embodiment of the invention.
Figure 5:
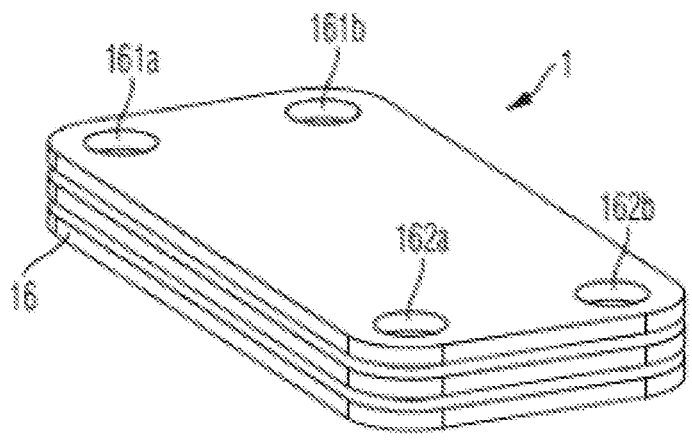
FIG. 5 shows a perspective view of a flow reactor according to the third embodiment.
Figure 6:
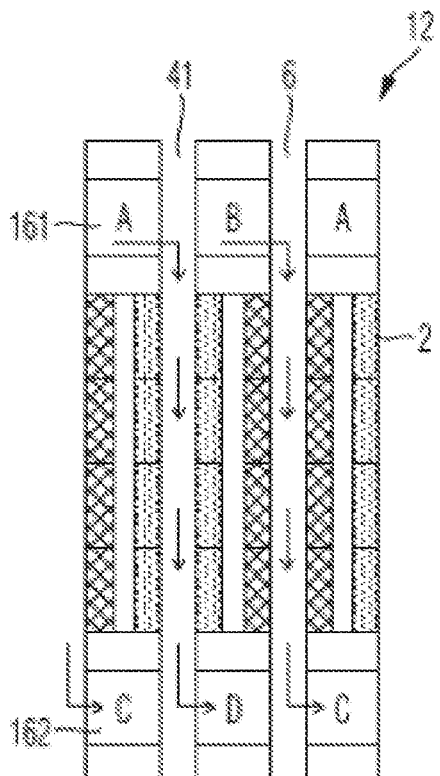
FIG. 6 shows a sectional view of the third embodiment of the invention.

A third embodiment of the flow reactor according to the invention is explained on the basis of FIGS. 4, 5 and 6. The third embodiment of the flow reactor consists of individual guide plates 16 as shown in FIG. 4. These plates can be stacked on top of one another with interposed sealing elements, so that a flow reactor of the desired size can be assembled from individual guide plates 16.

FIG. 5 shows a perspective view of such a flow reactor 1. FIG. 6 shows a cross-sectional view of a flow reactor. The number of the guide plates 16 need not be exactly three in all embodiments of the invention. In fact, larger or smaller numbers of guide plates 16 can be combined to form a flow reactor 1, depending on the reaction carried out and the available installation space and the amount of substance to be produced or reacted. In some embodiments of the invention, the number can be between about 10 and about 500 or between about 20 and about 100.

As shown in FIG. 4, the single guide plate 16 has a sub-area which is provided with the microstructuring 2 according to the invention. It is intended that the reactant 41 floods the microstructuring 2.

Furthermore, the guide plate 16 has inlet openings 161a and 161b. At the opposite end of the guide plate 16 there are outlet openings 162a and 162b. For easier identification in the cross-section shown in FIG. 6, these are additionally marked with A, B, C and D.

The rear side, which is not visible in FIG. 4, can optionally also be provided with the microstructuring. In other embodiments of the invention, the rear side can be uncoated.

In some embodiments of the invention, the guide plate 16 can consist of copper, aluminum or titanium in order to thus render possible good thermal conductivity.

As illustrated in FIGS. 5 and 6, a plurality of guide plates 16 are stacked on top of one another in alternating orientation according to FIG. 4, so that the front sides provided with microstructuring 2 come to lie against one another and the rear sides also come to lie against one another. The stack shown in FIG. 6 as an example on the basis of three guide plates 16 can be continued cyclically in order to realize the desired size of the flow reactor 1 or the second longitudinal portion 12 of the flow reactor 1.

Sealing elements can be inserted between adjacent guide plates 16, for example made of a polymer, a thermosetting resin or an elastomer. For reasons of simplification, however, these are not shown in FIGS. 5 and 6.

The sealing elements create a gap between adjacent guide plates 16, which forms a flow channel between adjacent guide plates 16. As shown in FIG. 6, a flow channel is formed between the sides of two adjacent guide plates 16, which are provided with microstructuring 2, said flow channel being intended to receive the reactant 41. This reactant flows from the inlet A to the outlet D.

The subsequent flow channel is provided to receive a heat transfer medium 6. This medium flows from the inlet B to the outlet C. The heat transfer medium 6 can be e.g. a thermal oil, water, hot gas, steam or also a ball fluid. A ball fluid comprises balls or spheres made from a metal or an alloy to transfer heat from a heat source to a heat sink. Thus, each guide plate 16 is heated from one side, whereas the desired reaction proceeds on the opposite side, which is provided with the microstructuring 2 and optionally a catalyst 3.

Figure 7:
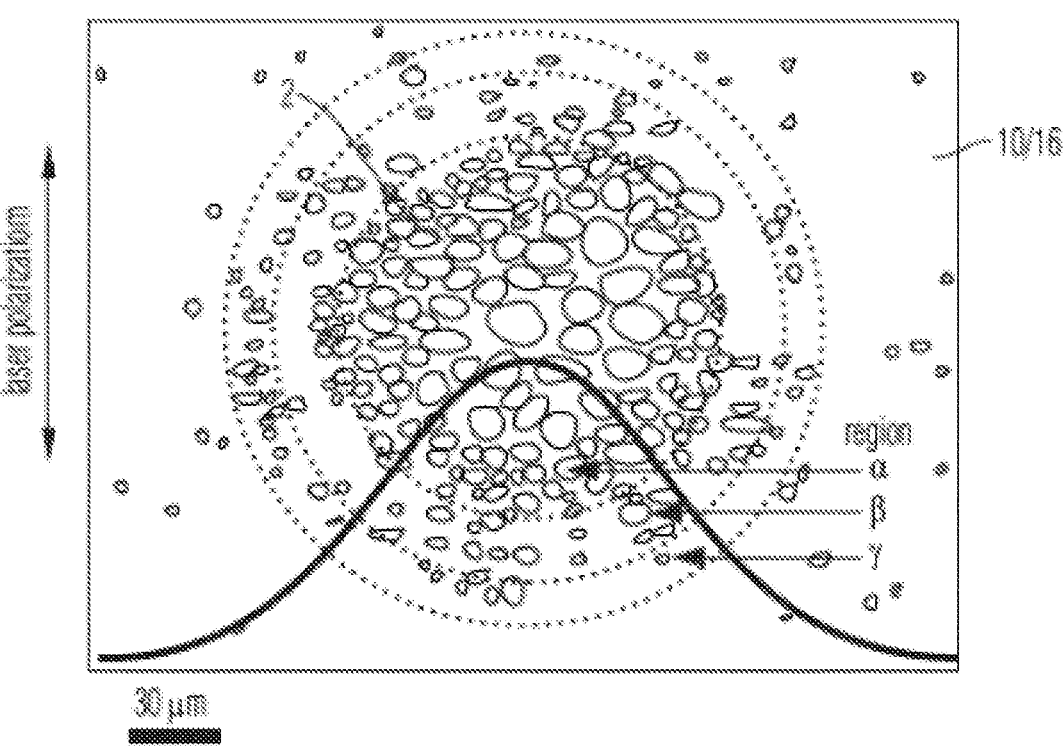
FIG. 7 shows an electron microscopic image of the microstructuring used according to the invention.

FIG. 7 illustrates the production of the microstructuring according to the invention using laser radiation from a short pulse laser. An electron-microscopic image of a titanium sheet is shown, which can be used as a wall 10 or guide plate 16 of a flow reactor 1. The titanium sheet was irradiated with polarized laser radiation of a short pulse laser. The laser beam shows a somewhat Gaussian-shaped energy distribution at the point of impact.

As shown in FIG. 7, a conical structure with dimensions of a few μm is formed in the center of the impact point, namely a diameter on the base of about 10 μm to about 30 μm and an aspect ratio of about 1:3 to about 3:1. This area is referred to as region α in FIG. 7.

This microstructured area is surrounded by an annular region which is referred to as region ß. This is where sponge-like submicrometer porosities are formed. The region ß is surrounded by an annular region γ, which was created by even lower light intensities. This is where periodic submicrometer structures are formed.

If the microstructuring 2 is to be created over a larger subarea 105, the laser beam can be scanned over the subareas during the fabrication of said microstructuring 2, thereby providing the microstructuring 2 in one subarea after the other.

Figure 8:
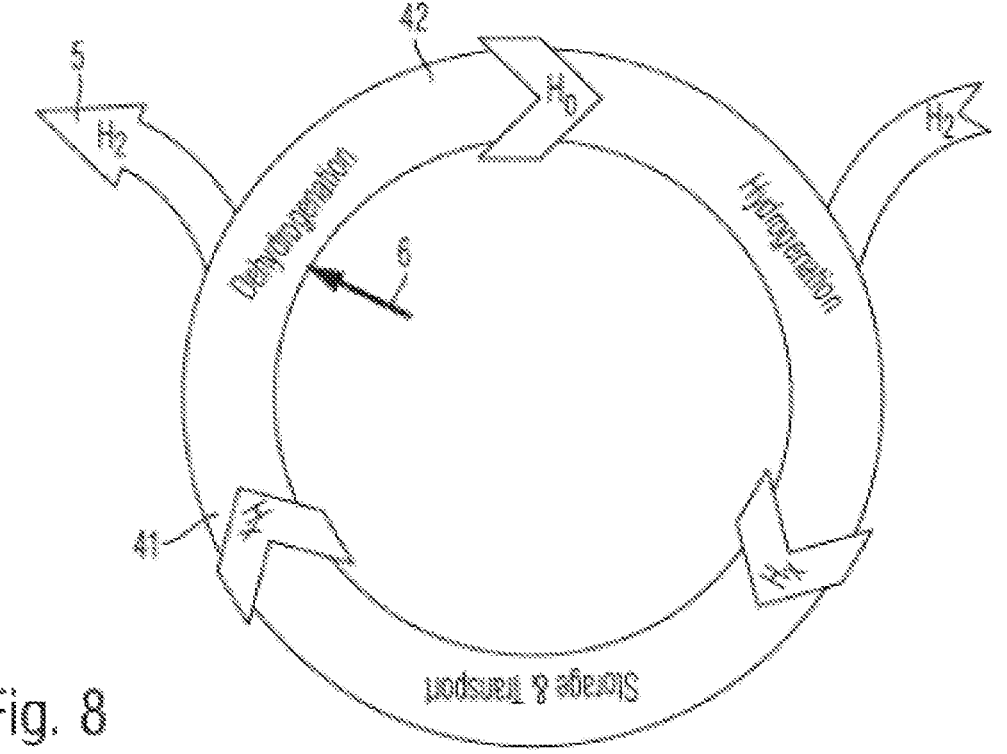
FIG. 8 shows the hydrogen storage as an application example of the invention.

FIG. 8 shows an exemplary embodiment of the invention in more detail. Hydrogen is a promising candidate for the energy storage and energy transport. Hydrogen can, for example, be obtained from the electrolysis of water. For this purpose, electricity from renewable energy sources can be used, which has no consumers at the time of production.

An LOHC can be used to store the hydrogen gas thus produced. The LOHC can contain or consist of dibenzenzenetoluene, toluene, N-ethylcarbazole and/or benzyltoluene, for example. It is hydrogenated by the hydrogen generated from electrolysis and thus reacted to form perhydro-dibenzenetoluene, methylcyclohexane, perhydro-N-ethylcarbazole and/or perhydro-benzyltoluene. An LOHC hydrogenated in this way is storage stable and can be easily transported or stored in liquid-tight containers under standard conditions (25° C., 101325 Pa).

In order to withdraw the bound hydrogen, the hydrogenated LOHC is supplied as reactant 41 to a flow reactor according to the invention. Furthermore, a heat flow 6 is supplied to the flow reactor. This leads to catalytic dehydrogenation of the LOHC. The dehydrogenated LOHC is removed as a product from the flow reactor and can be hydrogenated again with hydrogen at a later time. As a further product, hydrogen 5 can be removed from the flow reactor in gaseous form. The hydrogen can then be reacted to form electrical and/or mechanical energy in a gas turbine, a piston engine or a fuel cell.

The advantage of the flow reactor according to the invention will be explained below by means of an example.

In a first exemplary embodiment, a known flow reactor as shown in FIG. 1 is used. Perhydro-dibenzenetoluene is added to this reactor as hydrogenated LOHC. The flow rate is 20 ml per minute. The reactor is heated to a temperature of 310° C. Alumina particles which are coated with platinum coating of 0.5 wt % are used as the catalyst. The heat is supplied to the catalyst to a small extent via the wall 10 of the reactor 1, wherein the heat conduction within the catalyst bed is only slight due to the only point-like contact between the particles. Secondly, the catalyst is heated by the flowing reactant. Under these conditions, the productivity was 0.45 $g_{H2}·g_{kat}^{-1}·min^{-1}$.

The test was repeated with a flow reactor according to the invention. The reactor according to invention had an aluminum wall. A sub-area of 1 cm² was provided with the microstructuring according to invention, which was produced by laser structuring. At the same temperature, a productivity of 23.5 $g_{H2}·g_{kat}^{-1}·min^{-1}$ resulted for the surface provided with the microstructuring according to the invention. The value is thus more than 52 times higher than can be achieved with a known flow reactor.

Of course, the invention is not limited to the illustrated embodiments. Therefore, the above description should not be regarded as restrictive but explanatory. The following claims are to be understood in such a way that a stated feature is present in at least one embodiment of the invention. This does not exclude the presence of further features. If the claims and the above description define "first" and "second" embodiments, this designation is used to distinguish between two similar embodiments without determining a ranking order.

The invention claimed is:

1. A method for reacting a gaseous or liquid reactant under the influence of a catalyst, said method comprising:
    providing a flow reactor having at least one channel, said channel being delimited by a plurality of walls, wherein at least one sub-area of at least one of the plurality of walls has a microstructuring produced by short pulse laser radiation applied to the at least one sub-area, said short pulse laser radiation having a pulse duration of less than one nanosecond, said microstructuring comprising individual structures having a diameter on a base of about 10 μm to about 30 μm and an aspect ratio of about 1:3 to 3:1 calculated as a ratio of the structure's width to its height, wherein at least one catalyst is applied to the microstructuring, and supplying the reactant to the channel of the flow reactor, and
    allowing the reactant to undergo a chemical reaction inside the channel of the flow reactor.

2. The method of claim 1, wherein the at least one wall contains or consists of aluminum, titanium, silver, or stainless steel.

3. The method of claim 1, wherein the catalyst selected from the group consisting of platinum, nickel, silver, palladium, at least one manganese oxide, rhodium, and ruthenium.

4. The method of claim 1, wherein the microstructuring is hydrophilic.

5. The method of claim 1, wherein heat is supplied or removed via the wall of the channel.

6. The method of claim 1, wherein the reactant contains or consists of a hydrogenated liquid organic hydrogen carrier (LOHC) and the product contains or consists of at least hydrogen gas.

7. The method of claim 6, wherein the LOHC is selected from perhydro-dibenzenetoluene and/or methylcyclohexane/toluene and/or perhydro-N-ethylcarbazole/N-ethylcarbazole and/or perhydro-benzyltoluene/benzyltoluene.

8. The method of claim 6, wherein conversion of the reactant to hydrogen gas is more than 12 $gH2·g_{kat}-1·min-1$.

9. A method for reacting a hydrogenated of liquid organic hydrogen carrier (LOHC) under the influence of a catalyst, said method comprising:
    providing a flow reactor wherein a first surface of a wall of said flow reactor is exposed to said LOHC;
    microstructuring at least one sub-area of the first surface of the wall of the flow reactor, said microstructuring comprising individual structures having a diameter on a base of about 10 μm to about 30 μm;
    applying a catalyst to the microstructuring of the at least one sub-area of the first surface of the wall;
    exposing the at least one sub-area of the first surface of the wall to said LOHC wherein the microstructuring and catalyst enhance the rate of a reaction.

10. The method of claim 9, wherein said step of microstructuring comprises:
    applying short pulse laser radiation to the at least one sub-area of the first surface of the wall, said short pulse laser radiation having a pulse duration of less than one nanosecond.

11. The method of claim 9, wherein
    said catalyst is selected from the group consisting of platinum, nickel, silver, palladium, at least one manganese oxide, rhodium, and ruthenium.

12. The method of claim 9, wherein the microstructuring is hydrophilic.

13. The method of claim 9, wherein the individual structures have an aspect ratio of about 1:3 to 3:1 calculated as a ratio of the structure's width to its height.

14. The method of claim 9, wherein
    a product of the reaction contains or consists of at least hydrogen gas.

15. The method of claim 14, wherein the LOHC is selected from perhydro-dibenzenetoluene, methylcyclohexane/toluene, perhydro-N-ethylcarbazole/N-ethylcarbazole, and perhydro-benzyltoluene/benzyltoluene.

16. The method of claim 15, wherein conversion of the LOHC to hydrogen gas is more than 12 $gH_2$ $gkat^{-1}$ $min^{-1}$.

* * * * *